April 1, 1958

C. N. WINNINGSTAD 2,829,316

CONTROL AND FAULT DETECTOR CIRCUIT

Filed Jan. 4, 1954

INVENTOR.
CHESTER N. WINNINGSTAD
BY

ATTORNEY.

INVENTOR.
CHESTER N. WINNINGSTAD
BY
Roland A. Anderson
ATTORNEY.

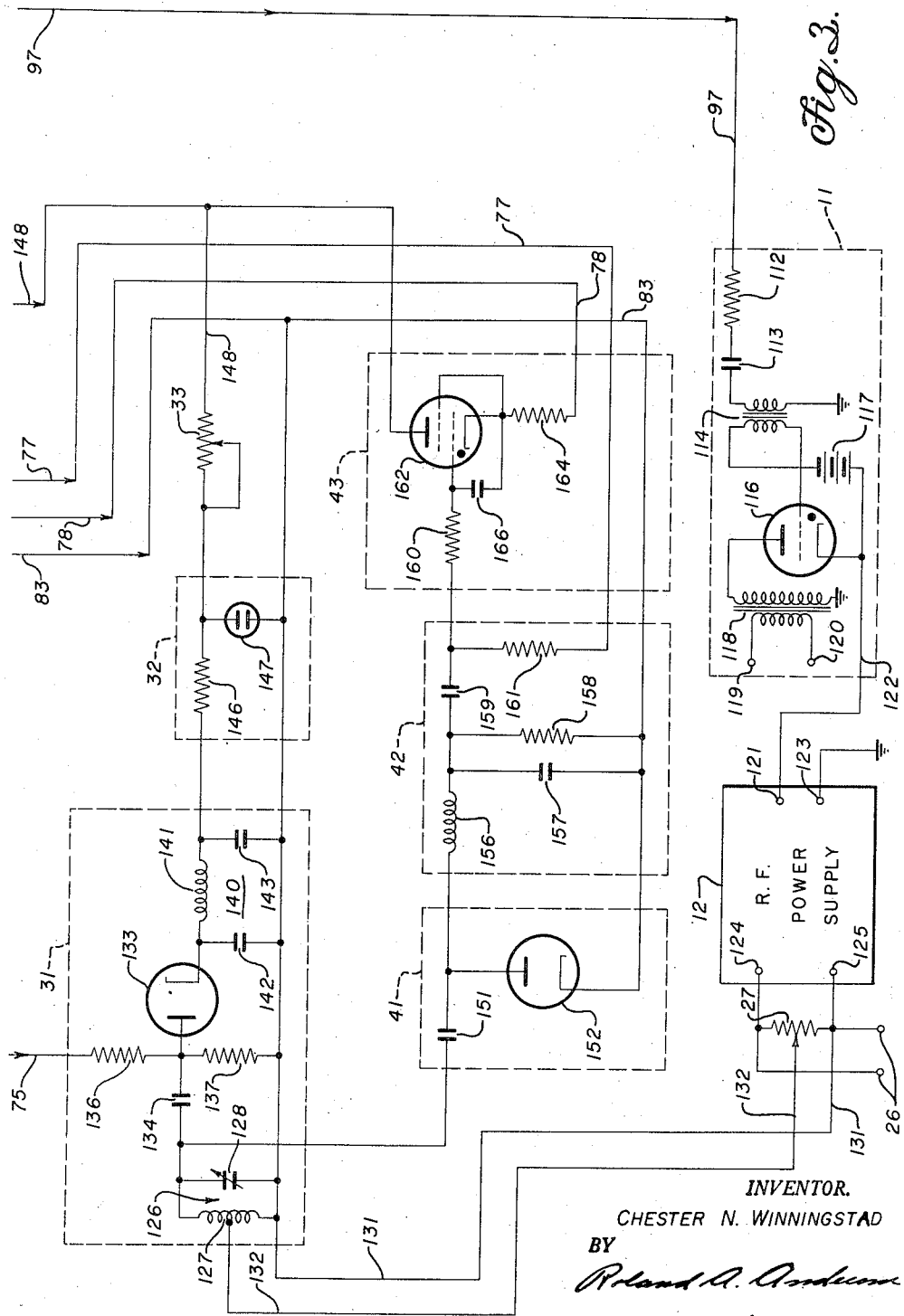

United States Patent Office 2,829,316
Patented Apr. 1, 1958

2,829,316

CONTROL AND FAULT DETECTOR CIRCUIT

Chester N. Winningstad, San Lorenzo, Calif., assignor to the United States of America as represented by the United States Atomic Energy Commission Application January 4, 1954, Serial No. 402,190

10 Claims. (Cl. 317—20)

The present invention relates to a control circuit and more particularly to a control and fault detector circuit for a radio-frequency system.

In many types of radio-frequency circuits it is desirable that the power supply be controlled in a manner which ensures suitable protection for the elements of the circuit. Such control should be able to automatically start the flow of energizing power to the radio-frequency power supply and to gradually increase the power to a predetermined level which is below the point where destruction occurs upon the happening of a fault. If the radio-frequency power supply output fails to increase during such period, the control should not further increase the power. On the other hand, if the output of the radio-frequency power supply properly increases, then the control should continue to increase the power to a maximum value. After the maximum value of radio-frequency output has been achieved, the control should be responsive to a "fault," such as a short circuit in the radio-frequency system being driven, so that the flow of power is interrupted for an interval before the cycle is repeated.

The present invention achieves control, as outlined above, by providing a control circuit which is normally in a disabled condition. The input to the control circuit includes a capacitor which gradually charges and applies an operating potential to the control circuit. As the control circuit operates power is gradually applied to the radio-frequency power supply to a predetermined level. As the output of the radio-frequency power supply increases, a regenerative loop between the output and the aforementioned capacitor increases the charge on the latter to raise the former until the maximum output is achieved. A fault detector loop is connected in parallel with the regenerative loop and is responsive to high speed or rapid changes in the radio-frequency voltage, as caused by a "fault," to discharge the capacitor and return the control circuit to its normal condition. The cycle of operation is then repeated at the termination of the fault.

It is therefore an object of the present invention to provide a new and improved control and fault detector circuit.

Another object of the invention is to provide a control and fault detector circuit wherein a certain level of operation must be reached before full puower is applied.

A further object of the invention is to provide a control and fault detector circuit using standard elements and only tubes which are not subject to drift.

Still another object of the invention is to provide a control and fault detector which is independent of the operating level of the system being protected.

An additional object of the invention is to provide a control and fault detector circuit which may be readily made dependent, or independent, of frequency.

Other objects and advantages of the invention will be apparent in the following description and claims considered together with the accompanying drawing, in which:

Figure 3 is a schematic wiring diagram of the remaining portion of the invention.

Figure 1:
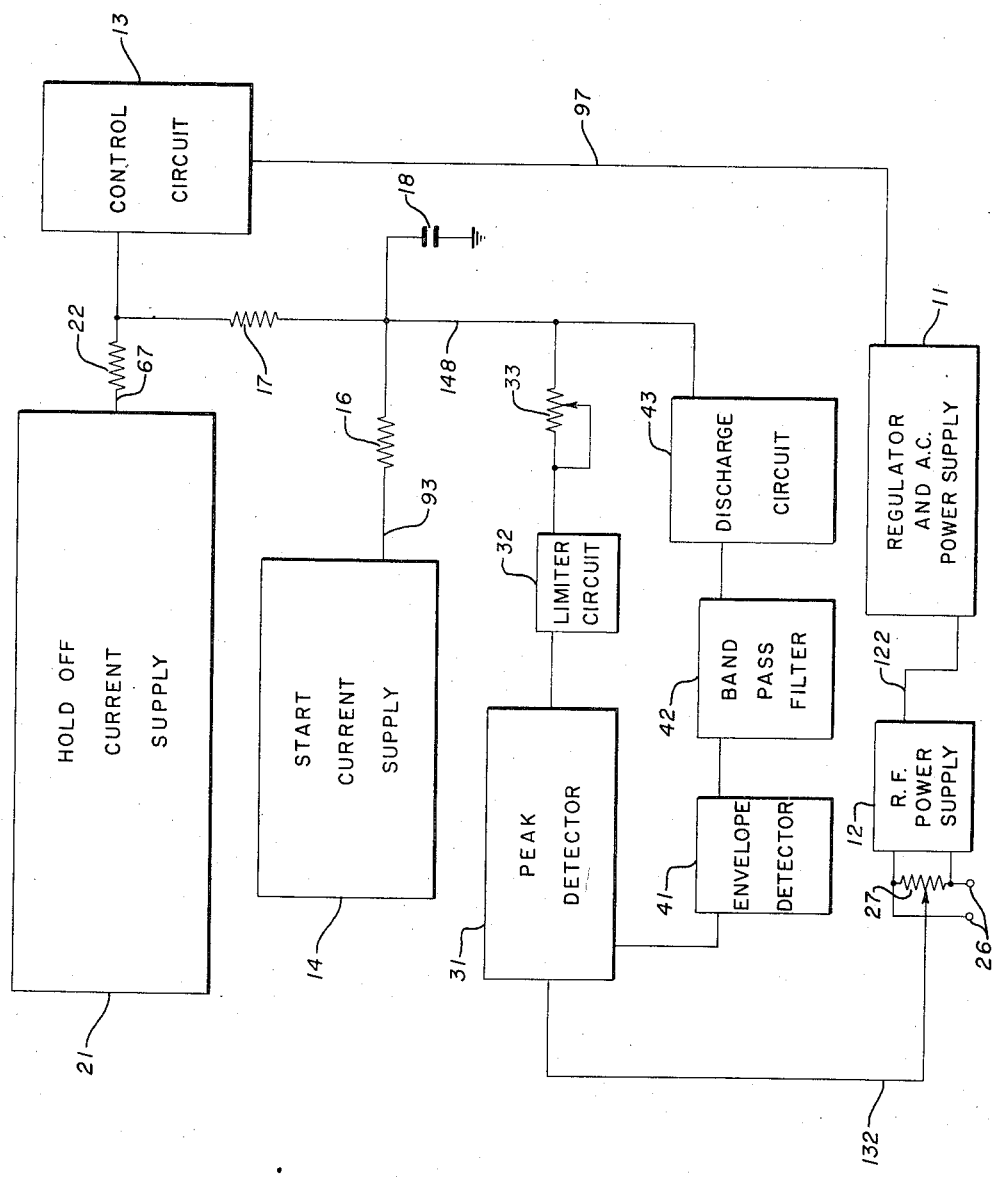
Figure 1 is a schematic block diagram of the invention.

Referring to the drawing in detail, Fig. 1 in particular, there is provided a regulator and A. C. (alternating current) power supply unit 11 having the output thereof connected to supply operating potential to a conventional R. F. (radio-frequency) power supply 12 of a radio-frequency system (not shown). A control circuit 13 is connected to the regulator and A. C. power supply unit 11 and determines the amount of power delivered by the latter unit to the R. F. power supply 12. To initiate operation of the control circuit 13, there is provided a start current supply 14 which is connected by two series-connected resistors 16 and 17 to the control circuit 13. A storage capacitor 18 is connected between the junction of the two resistors 16 and 17 and ground so that the voltage transfer between the start current supply 14 and the control circuit 13 is gradual. As a means for rendering the control circuit 13 inoperative at such time as the voltage at the junction between the two resistors 16 and 17 is substantially zero, a hold off current supply 21 is connected to the control circuit by a resistor 22.

The output 26 of the R. F. power supply 12 may be readily connected to an R. F. system (not shown) as mentioned above. A potentiometer 27 is connected across the output 26 and the adjustable element then provides a source of proportionate voltage. A regenerative series circuit comprising a peak detector 31, a limiter circuit 32, and a potentiometer 33 is connected between the adjustable element of the potentiometer 27 across the output of the R. F. power supply 12 and the junction of the two resistors 16 and 17 with the capacitor 18. For a given setting of the potentiometer 27 the charge upon the capacitor 18 increases as the voltage at the output of the R. F. power supply 12 increases until it reaches a value determined by the limiter circuit 32. Thus the voltage impressed from the capacitor 18 upon the control circuit 13 increases and results in a control signal being applied to the regulator and A. C. power supply unit 11 which, in turn, increases the power delivered to the R. F. power supply 12.

Connected in parallel with the above-discussed regenerative series circuit is a fault circuit comprising a series-connected envelope detector 41, band pass filter 42, and discharge circuit 43. Such fault circuit operates under certain circumstances to lower the junction of the two resistors 16 and 17 with the capacitor 18 to substantially zero voltage, whereupon the hold off current supply 21 causes the control circuit 13 to disable the regulator and A. C. power supply unit 11 so that there is zero power output.

From the foregoing it will be seen that the control circuit 13, regulator and A. C. power supply unit 11, and R. F. power supply 12, may be readily combined and, for simplicity, considered as an electronically controlled R. F. power supply operating from a control bus. Such control bus then comprises the lead from the junction of the two resistors 17 and 22.

Figure 2:
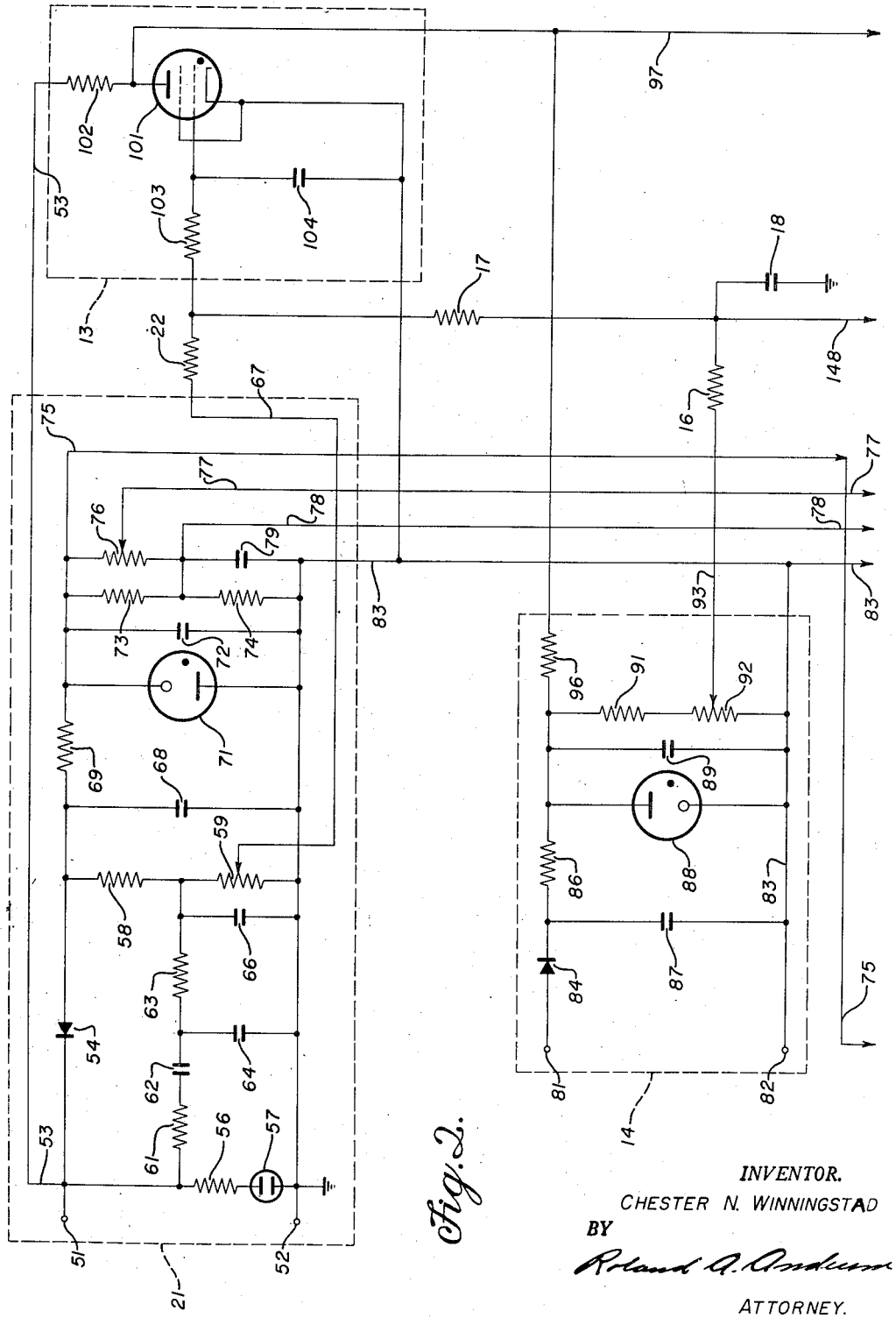
Figure 2 is a schematic wiring diagram of a portion of the invention.

Referring now to the hold off current supply 21, in detail (see Fig. 2), there are provided a pair of input terminals 51 and 52 which may readily be connected to a source of commercial alternating current (not shown). One input terminal 51 is connected to a lead 53 and to the cathode terminal of a selenium type rectifier 54. A resistor 56 and an indicating neon lamp 57 are connected in series between the two input terminals 51 and 52, the latter terminal 52 being grounded. As a voltage divider there is provided a series-connected resistor 58 and potentiometer 59 connected from the anode terminal of the rectifier 54 to the grounded terminal 52. It will be noted that D. C. (direct current) voltage is developed across the resistor 58 and potentiometer 59 and that an A. C. (alternating current) voltage is developed across the resistor 56 and lamp 57. To add an A. C. voltage, which lags by 90 degrees the voltage impressed at the input terminals 51 and 52, to the D. C. voltage across the potentiometer 59, a resistor 61, a capacitor 62, and a second resistor 63 are series-connected between the terminal 51 and the junction of the resistor 58 and potentiometer 59 with a first capacitor 64 and a second capacitor 66 respectively connected from the ends of the resistor 63 to the grounded terminal 52. A lead 67 is connected between the adjustable element of the potentiometer 59 and the resistor 22 for the transfer of a D. C. voltage with an A. C. component superimposed thereon.

The voltage across the resistor 58 and potentiometer 59 combination is also utilized to supply operating voltages to elements of the circuit and for such purposes a smoothing capacitor 68 is connected in parallel therewith. One end of a series resistor 69 is connected to the junction of the capacitor 68 and rectifier 54 for further smoothing action. A regulator tube 71, of the glow discharge type, and a capacitor 72 are connected in parallel between the other end of the resistor 69 and the grounded terminal 52 to further remove fluctuations from the voltage developed. A resistance voltage divider is connected in parallel with the capacitor 72 and comprises a first resistor 73 and a second resistor 74. One end of a lead 75 is connected to the junction of the series resistor 69 and the potentiometer 76. To provide a variable voltage point a potentiometer 76 is connected across the first resistor 73 with the adjustable element of such potentiometer connected to a lead 77. Also, a lead 78 is connected to the junction of the first and second resistors 73 and 74 with a by-pass capacitor 79 connected from such junction to the grounded terminal 52.

The start current supply 14 is provided with a pair of terminals 81 and 82 which may be connected to the same source of commercial power as previously-described terminals 51 and 52 of the hold off current supply 21 or to a separate similar source. To maintain the same voltage base throughout the circuit, the latter terminal 82 is connected to the grounded terminal 52 by a lead 83. The anode terminal of a selenium type rectifier 84 is connected to the terminal 81 and the cathode terminal of the rectifier is connected to the junction of a resistor 86 and capacitor 87, the latter being further connected to the lead 83. A parallel circuit comprising a glow discharge type regulator tube 88 and a capacitor 89 is connected from the other side of the resistor 86 to the lead 83. A resistance voltage divider comprising a resistor 91 and a potentiometer 92 is connected in parallel with the capacitor 89 with the adjustable element of the potentiometer connected by a lead 93 to the resistor 16. The junction between the resistor 86 and the resistor 91 is connected by a resistor 96 to one end of a lead 97.

Referring now to the control circuit 13, it will be noted that a tetrode type gaseous discharge tube 101 is provided as the principal element. The lead 53 from the terminal 51 is connected through a dropping resistor 102 to the anode of the tetrode tube 101 and the anode, in turn, is directly connected to the lead 97. The cathode of such tetrode tube 101 is directly connected to the suppressor grid and to the grounded lead 83. To complete the connections of the tetrode tube 101 a current limiting resistor 103 is connected from the control grid to the junction of the two resistors 17 and 22 between the two current supplies 14 and 21, and a by-pass capacitor 104 is connected from the control grid to the cathode. The gaseous discharge tube 101 is connected for conventional phase back operation which will be described more fully hereinafter.

The lead 97, originating at the anode of the tube 101 in the control circuit 13, is extended to the regulator and A. C. power supply unit 11 (see Fig. 3) where it is connected to one end of a limiting resistor 112, the other end of which is connected to one side of a capacitor 113. The other side of such capacitor 113 is connected to one lead of one winding of a pulse type transformer 114, the other lead of such winding being connected to ground. One lead of the second winding of such transformer 114 is directly connected to the control grid of a triode type gaseous discharge tube 116 so that the voltage impressed on the control grid is 180 degrees out of phase with the voltage of lead 97. A suitable source of bias voltage 117, illustrated as a bank of batteries, is connected with the negative terminal to the other lead of the second winding of the transformer 114 and with the positive terminal to the cathode of the tube 116. A transformer 118 is provided with one lead of the secondary winding grounded and the other lead directly connected to the anode of the tube 116. The primary winding of the transformer 118 is connected between two input terminals 119 and 120. The two terminals 119 and 120 are suitably connected to the same source of commercial power as terminals 51 and 52 so that the anode voltage of tube 101 in the control circuit 13 and anode voltage of tube 116 in the regulator and A. C. power supply unit 11 are in phase. The cathode of the gaseous discharge tube 116 is connected to a power input terminal 121 of the R. F. power supply 12 by a lead 122. The other power input terminal 123 of the R. F. power supply 12 is connected to ground as a ground return. As stated previously, the potentiometer 27 is connected across the output of the R. F. power supply 12, as taken from output terminals 124 and 125 and connected to the output 26.

Referring now to the peak detector 31 there is provided a resonant circuit 126 comprising a coil 127 connected in parallel with a variable capacitor 128. To impress a portion of the output of the R. F. power supply 12, a lead 131 is connected from one terminal 125 thereof to one side of the coil 127 while a second lead 132 is connected from the adjustable element of the potentiometer 27 to a tap on the coil 127. The lead 131 is also connected to the grounded lead 83 to establish the proper voltage base. The junction of the coil 127 and capacitor 128, which is not connected to the lead 131, is coupled to the anode of a diode detector tube 133 by a capacitor 134 connected therebetween. The anode of the detector tube 133 is connected by a resistor 136 to the lead 75 and by a resistor 137 to the grounded lead 83. A pi-section filter 140 comprising a series inductor or choke coil 141 and a pair of similar shunt capacitors 142 and 143 is suitably connected between the cathode of the detector tube 133 and the grounded lead 83. The other side of such filter 140 is connected by a lead 144 to one end of a resistor 146 in the limiter circuit 32. The other end of the resistor 146 is connected to one side of a neon lamp 147 having the other side connected to the grounded lead 83. Such neon lamp 147 serves as a limiter for the circuit and determines the maximum amount of power applied to the R. F. power supply 12 in a manner which will be set forth hereinafter. The junction of the resistor 146 and neon lamp 147 is connected to one end of the potentiometer 33, the other end of which is connected by a lead 148 to the capacitor 18 as previously described.

The output of the resonant circuit 126 in the peak detector 31 is coupled to the envelope detector 41 by a capacitor 151 which is connected from the ungrounded side of the resonant circuit to the anode of a diode type detector tube 152. The cathode of the detector tube 152 is connected to the grounded lead 83 to complete the operating connections thereof.

The band pass filter 42 follows the envelope detector and is such as to prevent the ordinary signal with modulation from passing. One end of a coil 156 is connected to the junction of the tube 152 and capacitor 151 in the envelope detector 41. The other end of such coil 156 is connected through a capacitor 157 to the grounded lead 83 with a resistor 158 connected in parallel with the capacitor. A capacitor 159 is connected from the junction of the coil 156 and capacitor 157 to one end of a resistor 160 of the discharge circuit 43. The junction of the capacitor 159 and resistor 160 is connected through a resistor 161 to the lead 77.

A tetrode type gaseous discharge tube 162 is provided as the principal element of the discharge circuit 43 with the control grid connected to the other end of the resistor 160. Other operating connections of the tetrode tube 162 include a direct connection of the anode to the lead 148, a connection of the suppressor grid to the cathode, and a connection of the cathode through a resistor 164 to the lead 78 and to the control grid through a capacitor 166.

With the circuit connections made in accordance with the foregoing and the circuit suitable energized, the position of the adjustable element of the potentiometer 59 in the hold off current supply 21 is established so that the control grid of the gaseous discharge tube 101 in the control circuit 13 is biased negatively just below the firing voltage of the tube. Such adjustment is made while both sides of the storage capacitor 18 are grounded, thus preventing any other voltages from reaching the tube 101 in the control circuit 13. Next, the output of the discharge circuit 43 is opened and the adjustable element of the potentiometer 92 in the start current supply 14 is established so that a positive bias is impressed upon the control grid of the tube 101 in the control circuit 13. The latter adjustment then permits a flow of power through the tube 116 in the regulator and A. C. power supply unit 11 to the R. F. power supply 12 and is preferably limited to a small value (a value which will not result in destructive damage to the R. F. system should there be a fault). The maximum value of voltage impressed by the R. F. power supply 12 upon the R. F. system may be established by setting the adjustable arm of the potentiometer 33 at the output of the limiter circuit 32. Finally, the sensitivity of the discharge circuit 43 may be established by varying the adjustable element of the potentiometer 76 in the hold off current supply 21 to alter the bias of the control grid of the tube 162 in the discharge circuit 43. Such adjustments as outlined above may be facilitated by the insertion of a switch having at least three positions, but which has not been illustrated for simplicity.

With the foregoing adjustments suitably accomplished the device is in proper condition for operation. Initially, the hold off current supply 21 develops a negative voltage (with respect to ground) across the potentiometer 59. Also, an alternating voltage appears across such potentiometer 59 with the phase thereof altered to lag the alternating voltage at the terminals 51 and 52 by ninety degrees. Since the adjustable element of the potentiometer 59 is coupled to the control grid of the tube 101 in the control circuit 13, the tube is biased below the cutoff voltage with the upper swing of the voltage approaching such cut-off voltage. At the same time the start current supply 14 develops a positive voltage across the potentiometer 92 which is impressed across the storage capacitor 18. As the charge upon the capacitor 18 increases a positive-going voltage is impressed through resistors 17 and 103 upon the control grid of the same tube 101.

In connection with the foregoing, it is to be noted that the anode of the tube 101 in the control circuit 13 is connected to the input terminal 51 by lead 53 and resistor 102 so that an alternating voltage is impressed. Also, a substantially small value of positive direct voltage is impressed at the anode of the tube 101 by the lead 97 to ensure proper operation. Since the tube 101 will only conduct during the time the anode grid is positive with respect to the cathode and the control grid voltage above the cut-off value, it will be apparent that conduction in the present instance can only occur from 90 to 180 degrees of a cycle of alternating voltage at the anode. Thus, as the charge on the capacitor 18 increases, the control grid voltage of the tube 101 rises above the cut-off voltage for an increasing period during the positive half-cycle of the anode voltage. The result of such action is that the voltage of the lead 97 resembles the alternating voltage at the terminal 51 with a portion of the positive half-cycle corresponding to the period that tube 101 conducts, substantially removed.

The anode voltage of the tube 101 in the control circuit 13 is coupled through a resistor 112, capacitor 113, and transformer 114 to the control grid of the gaseous discharge tube 116 in the regulator and A. C. power supply unit 11. It is to be noted that the capacitor 113 blocks the direct voltage components and that the transformer 114 provides phase inversion for alternating components. The anode voltage of the tube 116 is in phase with the alternating voltage impressed at the input terminals 51 and 52, by suitable connection of the transformer 118, so that the tube 116 is conductive only during the time tube 101 in the control circuit 13 is conductive.

A portion of the output of the R. P. power supply 12 is impressed upon the resonant circuit 126 which may readily be tuned to the frequency of the R. F. power supply by adjusting the variable capacitor 128. The voltage across the resonant circuit 126 is coupled to the anode of the diode detector tube 133 which is also biased negatively by the voltage of the lead 75. Such negative bias provides a delay in the action of the peak detector 31 so that the R. F. power supply 12 will build up to a reasonable level before an output voltage appears. Thus, at the cathode of detector tube 133 there is developed a direct voltage which is proportional to that portion of the positive half-cycles of the impressed R. F. voltage which exceeds that necessary to overcome the negative-anode bias. The filter 140, connected to the cathode of the detector tube 133, provides a smoothing action to decrease the fluctuations of the demodulated voltage and the time constant associated with such filter should be long compared to an R. F. cycle as well as short compared to the charging time of the storage capacitor 18. The output of the peak detector 31 is impressed across the limiter circuit 32 which principally comprises the neon lamp 147. It is well known that a neon lamp is substantially a constant voltage device when ionized. Thus, when the voltage across the resistor 146 and neon lamp 147 increases above the firing value of the lamp, the voltage across the lamp is constant and provides a maximum value.

The potentiometer 33 connects the voltage of the limiter circuit 32 across the storage capacitor 18 in such a manner that the voltage of the capacitor increases. As the charge of the capacitor 18 increases, the time during which the tube 101 in the control circuit 13 is conductive increases, and the output of the R. F. power supply 12 also increases. It is to be noted that the limiter circuit 32, in combination with the potentiometer 33 makes the final level, to which the R. F. power supply will be driven by conduction of the tube 101 in the control circuit 13, independent of normal variations in the operating level of the R. F. power supply 12. Such facts permit the output of the R. F. power supply 12 to be controlled manually without the circuit interfering, provided control is restricted to regions above the threshold of the limiter circuit 32.

The R. F. voltage of the resonant circuit 126 in the peak detector 31 is also coupled by the capacitor 151 to the anode of the diode detector tube 152 in the envelope detector 41. The positive side of the R. F. voltage thus impressed is removed and the negative half-cycles are passed to the band pass filter 42.

The band pass filter 42 comprises a low pass section including the coil 156, capacitor 157, and resistor 158, and a high pass section including the capacitor 159 and resistor 161. The values of the elements of the low pass section are selected so that frequencies in the region of the R. F. power supply 12, and higher, are substantially blocked while low frequencies are readily passed. Also, the values of the elements of the high pass section are selected to attenuate voltages having frequencies below that of the highest anticipated normal downwards modulation (as results from a "fault") of the R. F. power supply 12 while readily passing higher frequencies. Thus, the output of the low pass section is a negative voltage proportional to the average value (envelope) of the impressed half-cycles of the R. F. voltage and is applied to the high pass section where the envelope voltage is attenuated. The output of the high pass section is then substantially zero, unless a fault occurs, in which case there is a positive voltage which cancels the impressed negative voltage at the lead 77.

The resistor 160 and capacitor 166 in the input circuit of the discharge circuit 43 serve to transfer the voltage at the output of the band pass filter 42 to the control grid of the gaseous discharge tube 162 and tends to conduction of the tube because of capacitively coupled spurious signals.

The foregoing description sets forth the starting and normal operation of the circuit. Should a short circuit occur in the output circuit of the R. F. power supply 12, the voltage applied to the resonant circuit 126 in the peak detector 31 becomes zero substantially instantaneously. The rapid change of the R. F. voltage to zero has no direct effect upon the control circuit 13 because the capacitor 18 remains charged, but does result in operation of the discharge circuit 43 to discharge the capacitor. The latter result occurs because the output of the low pass section of the band pass filter 42 is changed from a negative value to zero in a short period of time, which change is passed by the high pass section with substantially no attenuation. Thus the composite of the voltages applied to the control grid of the gaseous discharge tube 162 in the discharge circuit is a positive-going "fault" voltage pulse which rises from a negative value below the cut-off value to one above the cut-off value. As soon as the grid of the tube 162 rises above the cut-off value the tube conducts and rapidly discharges the capacitor 18 by providing a low resistance discharge path. The removal of the charge on the capacitor 18 renders the tube 101 in the control circuit 13 nonconductive because of the negative voltage impressed by the hold off current supply 21. Thus, the power to the R. F. power supply 12 from the regulator and A. C. power supply unit 11 is cut off.

At the termination of the "fault" pulse the tube 162 in the discharge circuit 43 becomes nonconductive, thereby permitting the capacitor 18 to again charge and start a new cycle of operation. It is to be noted that, should the R. F. power supply 12 fail to operate properly, the voltage output of the regulator and A. C. power supply is a nondestructive low value. Thus there has been described a control and fault detector circuit for a radio-frequency power supply which achieves the aforementioned objects and advantages.

In connection with the foregoing description of the invention, it is desired to call attention to the fact that the regulator and A. C. power supply unit 11 merely illustrates one form in which control voltage developed by the control circuit 13 may be used. Also, as stated previously, the control circuit 13, regulator and A. C. power supply 11, and R. F. power supply 12 may be combined in one electronically regulated power supply of conventional design and operated from the control voltages developed by the remainder of the circuit. Further, the present invention may be made as frequency dependent, or independent, as desired by suitable selection of the elements of the band pass filter 42.

While the salient features of the present invention have been described in detail with respect to one embodiment it will be apparent that numerous modifications may be made within the spirit and scope of the invention, and it is therefore not desired to limit the invention to the exact details shown except insofar as they may be defined in the following claims.

What is claimed is:

1. In a control and fault detector circuit for a radio-frequency system, the combination comprising an electronically controlled radio-frequency power supply having a control input and a power output with the latter connectable to said system, first means connected to said input for establishing zero power at said output, second means connected to said input for gradually increasing the power at said output from zero to a selected value, responsive means connected between said output and input for increasing the power at said output above said selected value, and fault detector means connected in parallel with said responsive means for reducing said output to zero when a fault occurs in said system.

2. In a control and fault detector circuit for a radio-frequency system, the combination comprising an electronically controlled radio-frequency power supply having a control input and a power output with the latter connectable to said system, first means connected to said input for establishing an original value of control voltage to provide zero power at said output, second means connected to said input for gradually altering said control voltage until a selected value of power has been reached at said output, responsive means connected between said output and input for further altering said control voltage and increasing the power at said output beyond said selected value, and fault detector means connected in parallel with said responsive means for returning said input to the original value of control voltage established by said first means when a fault occurs in said system.

3. In a control and fault detector circuit for a radio-frequency system, the combination comprising an electronically controlled radio-frequency power supply having a control input and a power output with the latter connectable to said system, a series-connected resistor and storage capacitor connected across said input, first means connected across said input for establishing a control voltage to provide zero power at said output, second means connected across said capacitor to establish an increasing charge and alter said control voltage until a selected value of power has been reached at said output, responsive means connected between said output and capacitor for further increasing the charge on said capacitor to further alter said control voltage until maximum power has been reached at said output, and fault detector means connected in parallel with said responsive means for discharging said capacitor in response to a fault in said system.

4. In a control and fault detector circuit for a radio-frequency system, the combination comprising an electronically controlled radio-frequency power supply having a control input and a power output with the latter connectable to said system, a series-connected resistor and storage capacitor connected across said input, first means connected across said input for establishing a control voltage to provide zero power at said output, second means connected across said capacitor to establish an increasing charge and alter said control voltge until a selected value of power has been reached at said output, a peak detector connected to said output for developing a voltage proportional to the peak values of voltage at said output, limiter means connected between said peak detector and said capacitor for further increasing the charge on the latter to further alter said control voltage until maximum power has been reached at said output, and fault detector means connected between said output and said capacitor to provide a discharge path for said capacitor in response to a fault in said system.

5. The combination of claim 4 wherein the peak detector is further characterized as comprising a resonant circuit tuned to the frequency of said system connected to said output, a series diode vacuum tube having the anode coupled to said resonant circuit, bias means connected to said anode for raising the operating level, and a filter network connected between the cathode of said diode and said limiter means.

6. The combination of claim 4 wherein the limiter means is further characterized as comprising a neon lamp connected across the output of said peak detector whereby the substantially constant voltage above the conduction threshold of such lamp serves to limit the maximum value of said control voltage.

7. In a control and fault detector circuit for a radio-frequency system, the combination comprising an electronically controlled radio-frequency power supply having a control input and a power output with the latter connectable to said system, a series-connected resistor and storage capacitor connected across said input, first means connected across said input for establishing a control voltage to provide zero power at said output, second means connected across said capacitor to establish an increasing charge and alter said control voltage until a selected value of power has been reached at said output, responsive means connected between said output and capacitor for further increasing the charge on said capacitor to further alter said negative voltage until maximum power has been reached at said output, an envelope detector connected to said output for developing a voltage proportional to the envelope of the voltage at said output, a band pass filter connected to said envelope detector for attenuating voltages at the frequency of said system, and a discharge circuit connected between said band pass filter and said capacitor to provide a low resistance path to ground for charge upon said capacitor when a fault occurs in said system.

8. The combination of claim 7 wherein the envelope detector comprises a diode vacuum tube connected across said output for removing the positive sideband of the voltage thereof.

9. The combination of claim 7 wherein the band pass filter comprises a low pass filter and a high pass filter connected in series in such order, the elements of said low pass filter being selected so that minimum attenuation occurs at the frequency of modulation of the voltage at said output, and the elements of said high pass filter being selected so that minimum attenuation occurs at frequencies above the frequency of said system.

10. The combination of claim 7 wherein the discharge circuit comprises a gaseous discharge tube responsive to changes of impressed voltage having a frequency above the frequency of said system to provide a low resistance path to ground for charge on said capacitor.

No references cited.